(12) United States Patent
Dooley et al.

(10) Patent No.: US 11,194,574 B2
(45) Date of Patent: Dec. 7, 2021

(54) MERGING MEMORY ORDERING TRACKING INFORMATION FOR ISSUED LOAD INSTRUCTIONS

(71) Applicant: Arm Limited, Cambridge (GB)

(72) Inventors: Miles Robert Dooley, Austin, TX (US); Balaji Vijayan, Austin, TX (US); Huzefa Moiz Sanjeliwala, Austin, TX (US); Abhishek Raja, Austin, TX (US); Sharmila Shridhar, Austin, TX (US)

(73) Assignee: Arm Limited, Cambridge (GB)

( * ) Notice: Subject to any disclaimer, the term of this patent is extended or adjusted under 35 U.S.C. 154(b) by 158 days.

(21) Appl. No.: 16/521,663

(22) Filed: Jul. 25, 2019

(65) Prior Publication Data

US 2021/0026632 A1    Jan. 28, 2021

(51) Int. Cl.
*G06F 9/30* (2018.01)
(52) U.S. Cl.
CPC ........ *G06F 9/30043* (2013.01); *G06F 9/3005* (2013.01)
(58) Field of Classification Search
None
See application file for complete search history.

(56) References Cited

U.S. PATENT DOCUMENTS

| | | | | |
|---|---|---|---|---|
| 5,615,350 A | * | 3/1997 | Hesson | G06F 9/383 711/E12.02 |
| 2013/0205121 A1 | * | 8/2013 | Guthrie | G06F 9/30145 712/220 |
| 2017/0277542 A1 | * | 9/2017 | Fernsler | G06F 9/3851 |

* cited by examiner

*Primary Examiner* — John M Lindlof
(74) *Attorney, Agent, or Firm* — Nixon & Vanderhye P.C.

(57) ABSTRACT

An apparatus is described, comprising load issuing circuitry configured to issue load operations to load data from memory, and memory ordering tracking storage circuitry configured to store memory ordering tracking information on issued load operations. The apparatus also includes control circuitry configured to access the memory ordering tracking storage circuitry to determine, using the memory ordering tracking information, whether at least one load operation has been issued in disagreement with a memory ordering requirement, and, if so, to determine whether to re-issue one or more issued load operations or to continue issuing load operations despite disagreement with the memory ordering requirement. Furthermore, the control circuitry is capable of merging the memory ordering tracking information for a plurality of issued load operations into a merged entry in the memory ordering tracking storage circuitry.

22 Claims, 11 Drawing Sheets

Received instructions:

(1) LD1 → A     A = X + a
(2) LD2 → B     B = Y + b
(3) — DSB —     C = Z + c
(4) LD3 → C     D = Y + d
(5) LD4 → D

Execution order

LD2 → B
LD4 → D
LD1 → A
— DSB —
LD3 → C

MERGING MEMORY ORDERING TRACKING INFORMATION FOR ISSUED LOAD INSTRUCTIONS

BACKGROUND

Technical Field

The present technique relates to the field of data processing.

Technical Background

In some data processing systems, certain memory ordering requirements may be imposed on load operations by the system architecture. Such memory ordering requirements may constrain the relative order in which the load operations are to be performed relative to other operations or instructions.

SUMMARY

Viewed from one example, the present technique provides an apparatus comprising:
load issuing circuitry configured to issue load operations to load data from memory;
memory ordering tracking storage circuitry configured to store memory ordering tracking information on issued load operations; and
control circuitry configured, in at least one mode of operation, to access the memory ordering tracking storage circuitry to determine, using the memory ordering tracking information:
whether at least one load operation has been issued in disagreement with a memory ordering requirement; and
when it is determined that said at least one operation has been issued in disagreement with the memory ordering requirement, to determine whether to re-issue one or more issued load operations or to continue issuing load operations despite disagreement with the memory ordering requirement; and
wherein the control circuitry is capable of merging the memory ordering tracking information for a plurality of issued load operations into a merged entry in the memory ordering tracking storage circuitry.

Viewed from another example, the present technique provides a method comprising:
issuing load operations to load data from memory;
storing memory ordering tracking information on issued load operations in memory ordering tracking storage circuitry; and
in at least one mode of operation, accessing the memory ordering tracking storage circuitry to determine, using the memory ordering tracking information:
whether at least one load operation has been issued in disagreement with a memory ordering requirement; and
when it is determined that said at least one operation has been issued in disagreement with the memory ordering requirement, to determine whether to re-issue one or more issued load operations or to continue issuing load operations despite disagreement with the memory ordering requirement; and
merging the memory ordering tracking information for a plurality of issued load operations into a merged entry in the memory ordering tracking storage circuitry.

Viewed from another example, the present technique provides an apparatus comprising:
means for issuing load operations to load data from memory;
means for storing memory ordering tracking information on issued load operations; and
means for accessing the means for storing to determine, in at least one mode of operation, using the memory ordering tracking information:
whether at least one load operation has been issued in disagreement with a memory ordering requirement; and
when it is determined that said at least one operation has been issued in disagreement with the memory ordering requirement, to determine whether to re-issue one or more issued load operations or to continue issuing load operations despite disagreement with the memory ordering requirement; and
means for merging the memory ordering tracking information for a plurality of issued load operations into a merged entry in the means for storing.

Further aspects, features and advantages of the present technique will be apparent from the following description of examples, which is to be read in conjunction with the accompanying drawings.

DESCRIPTION OF EXAMPLES

Figure 1:
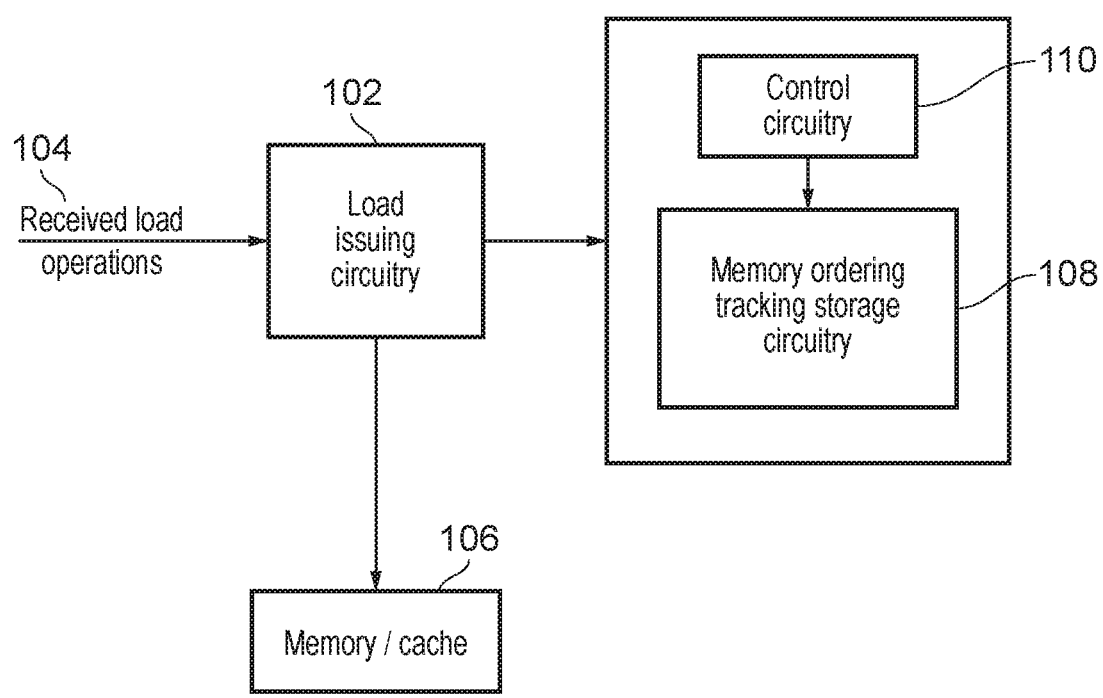
FIG. 1 is a block diagram schematically illustrating an apparatus according to the present technique.

As mentioned above, the instruction set architecture used in some data processing systems may allow programs to impose memory ordering requirements on certain load operations, where load operations are operations to load data from memory. Such memory ordering requirements may include, for example, memory barriers which may require that loads younger than the barrier are not performed ahead of operations older than the barrier. Another example of a memory ordering requirement may be an architectural rule that requires loads from the same address in memory to be carried out in an order corresponding to the program order of the corresponding load instructions.

One way of accounting for memory ordering requirements such as these could be to ensure that load operations are issued in an order which agrees with the memory ordering requirements. However, this may have an impact on performance, because if an earlier load is stalled, this may also stall other loads which the memory ordering requirement constrains to being issued after the earlier load.

In practice, it has been realised that issuing load operations in an order which disagrees with one or more memory ordering requirements may be allowable, provided that the result of the load operations is not altered due to the re-ordering. Doing so can improve performance because it means that if load stalls, a later load can be issued in its place—even if the memory ordering requirement would not allow this. Provided that, when the earlier load is processed, the result of that load is guaranteed to be the same as if the loads were issued in the correct order, it is acceptable to allow the processing to continue despite the disagreement between the memory ordering requirement and the actual order in which the loads were issued. Thus, by issuing some of the load operations in an order that does not agree with the memory ordering requirement, processing performance can sometimes be improved because the later load was issued earlier in the time spent waiting for the earlier load.

When issuing load operations in this way, in at least one mode of operation, it may be useful to be able to track issued load operations to identify whether they have been issued in disagreement with any memory ordering requirements defined by the system architecture, and whether the disagreement with the memory ordering requirement is problematic. To do this, memory ordering tracking storage circuitry can be provided, such as a read-after-read (RAR) buffer, which may have entries which can record information on issued load operations, allowing previously issued load operations to be monitored.

However, as the performance of data processing systems—for example, in terms of the throughput of operations and the size of the window within which load operations may potentially be issued out of order—increases, the number of issued load operations to be tracked increases. One way of dealing with this might be to increase the size of the memory ordering tracking storage circuitry; however, this approach requires a larger amount of circuit area to be taken up, increasing power consumption and other associated costs. This additional circuitry may not only be caused by the increased storage in storing the memory ordering tracking information for a greater number of entries, but also in the associated comparison logic which checks each entry to determine whether a given load has been issued in disagreement with the memory ordering requirement. The inventors realised, however, that improved performance and decreased power consumption could be achieved by merging tracking information for a plurality of issued load operations into a single entry of the memory ordering tracking storage circuitry.

According to the present technique, load operations are issued by load issuing circuitry, and memory ordering tracking storage circuitry stores memory ordering tracking information for the issued load instructions. The load issuing circuitry may be in the form of an issue queue or execution circuitry, and the memory ordering tracking storage circuitry may be in the form of a RAR buffer. It should be noted, however, that these are just examples of load issuing circuitry and memory ordering tracking storage circuitry, and that many other examples may also be used.

The memory ordering tracking storage circuitry allows issued load operations to be monitored for potential disagreement with memory ordering requirements (such as imposed by memory barrier instructions or other architectural rules) by control circuitry, which in at least one mode of operation accesses the memory ordering tracking storage circuitry to determine, using the memory ordering tracking information, whether a memory ordering requirement has been violated. If it determines that a memory ordering requirement has been violated, the control circuitry is also configured to determine whether or not to re-issue a number of the issued load operations.

In addition, as noted above, the control circuitry is also configured to merge the memory ordering tracking information for multiple load operations into a single entry in the memory ordering tracking storage circuitry.

Since the memory ordering tracking information is used to determine whether or not to re-issue load operations, it may seem counter-intuitive to merge such information for different load instructions, since one would think that a precise identification of properties of each load would need to be tracked in order to decide whether disagreement with a memory ordering requirement is problematic. Merging multiple loads into a single merged entry could lead to some imprecision in the recorded properties of the loads (for example, if the memory ordering tracking information for a given load operation includes an age of that load operation, merging the memory ordering tracking information for two entries could lead to the age information for at least one of the entries being lost). One would think this could be a disadvantage, potentially leading to a load operation not being re-issued when it needs to be, which may violate memory ordering rules. However, this can be avoided by setting the merged memory ordering tracking information conservatively so that at least those loads that do need to be re-issued are re-issued; however, this conservatism might mean that some load instructions are re-issued that do not need to be re-issued (false positive detection of re-issue scenarios). The inventors realised, though, that when the merged memory ordering tracking information is selected conservatively, the power-saving benefits achieved through merging (because the memory ordering tracking storage may need fewer entries for handling a given number of loads) may outweigh any losses due to re-issuing extra load operations, especially as the scenarios when loads need to be reissued tend to be relatively rare. Hence, overall merging can be beneficial to reduce circuit area and save power.

The present technique is particularly beneficial in processing apparatuses which are configured to execute load operations out-of-order, since such operations are more likely to be at risk of violating a memory ordering requirement. Thus, in some examples, the load issuing circuitry is configured to receive the load operations in a received order and to issue the load operations in an execution order different to the received order.

A particularly advantageous arrangement in which the present technique can be applied is where the load issuing circuitry comprises an issue queue and an execution unit. The issue queue is configured to receive a plurality of load instructions in the received order, wherein the received order is a predetermined program order, and to issue load operations corresponding to the load instructions to the execution unit in the execution order. The execution unit is configured to execute the load operations in the execution order to load the data from memory. In modern processing systems, as performance increases, the number of instructions held in the issue queue may also increase; this allows a greater window for re-ordering the execution order compared to the received order (program order), thus requiring more load operations to be stored in memory ordering tracking storage circuitry. Therefore, the ability to merge entries can be particularly useful in this scenario.

The predetermined program order may be an order of the load operations in a section of code being executed by the apparatus, while the issue queue is a storage structure for storing received instructions, which may have been fetched from an instruction cache or from memory in the predetermined program order. The execution order may be chosen due to being a particularly efficient order for executing the load operations; for example, because a later load can be issued ahead of an earlier load if it is independent of the earlier load and the earlier load is dependent on a stalled operation.

However, another arrangement in which the present technique can be applied can be within the memory system, for example within an interconnect or memory controller, which may receive load operations from an upstream source (such as a processor core or cache), and decide the order in which a downstream memory device should handle those requests. Again, some flexibility in varying the order in which the load operations are issued downstream could be useful, e.g. to enable performance/power improvements such as issuing a number of loads to the same memory region together to exploit properties where a memory hardware device may be faster at servicing another request to the same region than a request to a different region (e.g. because certain rows or banks of the memory device need to be activated but once active can be accessed faster). However, re-ordering the load issue order compared to the received order can lead to risks of memory ordering requirements being violated. Hence, by providing in the interconnect, memory controller or other memory system component the memory ordering tracking storage circuitry, which can be used to decide whether issuing of the loads in a different order to that prescribed by any memory ordering requirements requires re-issuing of the loads or can be tolerated, and merging entries as discussed above, this can enable improved performance while reducing the power and circuit area cost of implementing the memory ordering tracking storage circuitry and related comparison logic.

The memory ordering tracking information can be any information that allows a determination of whether there is a disagreement with a memory ordering requirement, and of whether it is acceptable to continue issuing load operations despite disagreement with any memory ordering requirement.

In some examples, the memory ordering tracking information comprises age information indicative of positions of the issued load operations in the received order. The age of the respective load operations can be used to determine whether a load operation younger than the current issued load has already been issued, which may be used to decide whether there is a disagreement with a memory ordering requirement.

In some examples, when the memory ordering tracking information includes age information, the age information for the merged entry in the memory ordering tracking storage circuitry may be age information for the youngest of the plurality of load operations merged into that entry.

It may seem counter-intuitive to merge the age information in this way, since the age information relating to the older of the merged loads will be lost, but this is a particularly conservative approach to setting the age information, that ensures that any already issued load operations younger than a given point of execution associated with a memory ordering requirement can be identified. Occasionally (e.g. when resetting the memory ordering tracking information after re-issuing loads as discussed further below), this conservatism could lead to operations being re-issued when they do not need to be, which may appear to be a waste of processing power. However, the inventors realised that the improvements in efficiency and reductions in cost achieved by the present technique outweigh any (rare) performance losses due to re-issuing extra operations.

In some examples the control circuitry is configured to determine whether any load operations have been issued in disagreement with the memory ordering requirement based on the age information. This is a particularly simple way of identifying whether a younger load operation (in the received order) has been issued before a specific event (such as a memory barrier instruction or another load for the same address), when the architecture constrains that event to occur before any younger loads are executed.

In some examples, the age information for said merged entry comprises age information of the youngest of said plurality of issued load operations in the received order, and the control circuitry is configured to determine whether one of the load operations associated with the merged entry have been issued in disagreement with the memory ordering requirement based on the age information of the youngest of said plurality of issued load operations, regardless of the ages of the others of said plurality of issued load operations.

In some examples, the control circuitry is configured to merge memory tracking information for at least a number of load operations specifying addresses in the same cache line.

It is common for processing systems to operate on a per-cache-line basis, especially in terms of accesses to memory, where data is often loaded from a cache rather than directly from memory. Also, coherency mechanisms will tend to manage snooping and other coherency functions at the granularity of a cache line. In some cases, the detection of whether a memory ordering requirement violation is problematic (requires re-issuing of instructions) or can be tolerated (continue processing without re-issuing), can be made based on information on whether the data at the address of the relevant loads has changed in the period between a younger load and an older load being issued in disagreement with a memory ordering requirement. One way of detecting this can be to detect snoop requests specifying an address corresponding to the loads tracked in a given entry of the memory ordering tracking storage circuitry. As such snoop requests tend to specify addresses at granularity of cache lines, it can be useful to perform the merging of entries also at the granularity of cache lines.

It should be noted that there may additionally be some load operations from different cache lines which have their memory ordering tracking information merged into the merged entry.

In some examples, the control circuitry is configured to merge the memory ordering tracking information for a plurality of load operations specifying addresses which give the same result when a predetermined hash function is applied to the addresses.

In this way, the number of memory addresses that may be associated with a given entry in the memory ordering tracking circuitry depends on the hash function applied. For example, a single entry in the memory ordering tracking circuitry may be associated with addresses corresponding to multiple cache lines. In this case, a hazard detected for one of the addresses associated with a merged entry may lead to a false positive identification of a hazard condition for an address of a different cache line, which has the same hash value as the address for which a hazard is detected. This may lead to load operations being flushed and re-issued that do not need to be. However, the inventors realised that this potential downside may be outweighed by the benefits of reduced circuit area and increased efficiency, caused by merging a greater number of pieces of memory ordering tracking information.

In the above examples, in the at least one mode of operation, the merging of memory ordering tracking information may be carried out based on the address specified by issued load operations. However, in some examples, the apparatus of the present technique may also have a single-entry mode of operation in which the control circuitry is configured to merge memory ordering tracking information for all issued load operations, independently of the addresses specified by the load operations, to form said merged entry.

In the single-entry mode of operation, all issued load operations may be represented with a single entry in the memory ordering tracking circuitry. This allows for even greater improvements in efficiency, since the unused entries in the memory ordering tracking storage circuitry can be powered down, as can the associated logic for comparing addresses of tracked loads against addresses of detected snoops, and for comparing the ages of entries in the buffer with ages of operations. With the single-entry approach, it may not be possible to detect whether an update to data in memory actually conflicts with the address of a previously issued load, so conservatively this may mean that any detected memory access from a conflicting source of memory accesses (such as another master device in the processing system) may be assumed conservatively to represent a possible hazard. Also, when a hazard is detected, it may not be possible to detect exactly whether a memory ordering requirement was violated, or where in the processing stream that memory ordering requirement was located. Hence, this approach means that hazards may be detected more often and more flushes of the pipeline may be needed, which a skilled person may expect would negate said improvements in efficiency. However, the inventors realised that, in some scenarios conflicting memory accesses from other sources may be very rare. For example, in a multi-processor system, if all but one of the processors is currently powered down, the remaining active processor will not detect any snoops/writes from the other processors and so hazards are unlikely to occur. Also, if all the processors in the multi-processor system are currently executing portions of software code which only access non-shared memory regions, without accessing any shared regions which could be accessed at other masters, then again hazard events will be very rare. In such scenarios, the power overhead of maintaining and looking up the memory ordering tracking information may not be justified, so providing the single-entry mode of operation in which merging is across all load operations can help to save power as the performance penalty when a hazard is detected is not expected to occur very often.

In addition to the single-entry mode of operation in which the memory ordering tracking information for all issued load operations is merged, the apparatus may also be configured to operate in a multiple-entry mode. In the multiple-entry mode, the control circuitry is configured to either merge the memory ordering tracking information for a subset of the issued load operations to form said merged entry, the subset being selected dependent on the addresses specified by the issued load operations (as in the examples described earlier), or to suppress merging of the memory ordering tracking information for the issued load operations (i.e. in that case the multiple-entry mode may be one that does not do any merging, and the only mode that supports merging could then be the single-entry mode).

In the case where memory ordering tracking information for a subset of the issued loads is merged based on the addresses of the loads, this could be carried out in terms of any of the above examples. For example, the memory ordering tracking information may be merged for loads specifying the same address or the same cache line, or for loads whose addresses give the same value when a predetermined hash function is applied to them. Alternatively, merging may be stopped altogether in the multiple-entry mode.

In either case, the multiple-entry mode allows the single-entry mode described above (the single-entry mode) to be implemented in appropriate scenarios, without adversely effecting the efficiency of the system in scenarios where hazards occur more frequently, due to hazards being detected more frequently in the single-entry mode. By providing an apparatus that can operate in either of the single-entry mode and the multiple-entry mode, the overall efficiency of the system can be improved.

In some examples, when operating in the multiple-entry mode of operation, the control circuitry is configured to switch from the multiple-entry mode of operation to the single-entry mode of operation when a predetermined condition is satisfied.

The detection of any of these conditions indicates that hazards may be expected to be very rare, and so the single-entry mode of operation may be more appropriate than the multiple-entry mode of operation, and may provide better efficiency, and acts as a trigger to switch from the multiple-entry mode to the single-entry mode. The predetermined condition may be any of the following: that the number of hazards or rate of hazards is less than some predefined threshold, or that a predetermined period has elapsed since the last detection of an access to shared memory. The predetermined condition may also include that a predetermined period has passed without a hazard being detected. The period used to detect these conditions could be measured in different ways, e.g. as a period of time, a number of processing cycles, a number of executed instructions, a number of memory accesses, etc.

In some examples, when a hazard threshold is exceeded while operating in the single-entry mode of operation, the control circuitry is configured to switch from the single-entry mode of operation to the multiple-entry mode of operation. The hazard threshold could in some cases be zero, that is when any hazard is detected at all, this could be enough to cause the mode to switch back to the multiple-entry mode. Alternatively, a non-zero threshold could be used, so that some hazards can be tolerated in the single-entry mode, but if the number of hazards or the rate of hazards exceeds the threshold, then the mode switches back to the multiple-entry mode so that a more precise detection of disagreement with memory ordering requirement and of hazards is possible, to avoid so many unnecessary flushes. The hazards increasing beyond the threshold may be a sign that the scenario when hazards were rare no longer arises due to a change in the status of other processors or of software workloads being processed.

Following switching from the single-entry mode of operation to the multiple-entry mode of operation, the control circuitry may be configured to suppress switching from the multiple-entry mode of operation to the single-entry mode of operation for a given period. By ensuring that the control circuitry does not switch back to the single-entry mode of operation before a predetermined time has passed, the performance impact of thrashing back and forwards between modes can be avoided.

Returning to a discussion of a mode other than the single-entry mode, when disagreement with a memory ordering requirement has been identified, any operations younger than a certain age (e.g. the age of the memory ordering requirement) may need to be re-issued. In particular, when it is determined that one or more issued load operations need to be re-issued following the violation of the memory ordering requirement, the load issuing circuitry is configured to re-issue at least any load operations younger than the youngest issued load operation guaranteed to be correct. This is because whether or not a given issued load operation is guaranteed to be correct depends on its age relative to that of a memory ordering requirement. Thus, one way to determine which operations to re-issue is to identify the youngest operation guaranteed to be correct and re-issue from that point.

The memory ordering tracking circuitry may take any of a number of forms. In some examples, the memory ordering tracking storage circuitry comprises one or more entries, each associated with one or more issued load instructions; and the memory ordering tracking information for each entry comprises hazard information indicative of whether a hazard has been detected for an address associated with that entry.

In some examples, the hazard comprises an event capable of altering data associated with said address associated with that entry. This could, for example, be a write to the memory location identified by that address, which may—for example—trigger a snoop event to update or invalidate associated cache entries.

Therefore, in some examples, in response to detecting a snoop message specifying an address associated with an entry of the memory ordering tracking storage circuitry, the control circuitry is configured to set the hazard information for that entry to indicate that a hazard has been detected for the one or more of the issued load operations associated with that entry. In this way, hazard information stored in the memory ordering tracking storage circuitry can be kept up to date using a technique that utilised existing features of the processing apparatus (such as a snoop mechanism provided in a coherency scheme).

The hazard information stored as part of the memory ordering tracking information in some examples may have a number of uses, but in some example arrangements it is used by the control circuitry to determine, when it is determined that disagreement with the memory ordering requirement has been detected, whether to re-issue the one or more issued load operations associated with that entry. For example, if the hazard information is set to indicate that a hazard has been detected, the control circuitry might determine that the associated load operations should be re-issued. This ensures that of the operations issued in disagreement with the memory ordering requirement, any load operations which may have returned incorrect results due to a potential write to the same address in the period when the loads were being handled out of order can be re-issued. On the other hand, when loads have been issued in disagreement with the memory ordering requirement, but no hazard has been identified, then the loads may be allowed to continue issuing without any loads being re-issued; this ensures that operations are correctly executed without wasting power by re-issuing operations which do not need to be re-issued.

In some examples, the hazard information may also be used to decide whether or not to merge memory ordering tracking information. The control circuitry may be configured to suppress merging of the memory ordering tracking information for the plurality of issued load operations when the hazard information for an entry associated with one of the plurality of issued load operations indicates that a hazard has been detected for that entry.

This is beneficial, as it helps to avoid the re-issuing of some instructions that do not need to be re-issued, saving processing power and therefore improving the efficiency of the system. If merging tracking information for a current load was merged into an entry for which the hazard information was already set to indicate that a hazard has been detected, then this would mean that the current load would be identified as potentially affected by the hazard (potential update to the data), however this hazard flagging would be unnecessary for the current load because issuing the current load after the hazard information has already been set means that the current load already observes the updated data provided by the write/snoop which caused the hazard information to be set, and so its outcome would be correct anyway. It is only the earlier issued load which was issued before the hazard flag was set which could potentially have incorrect results depending on the order in which it was issued relative to other loads. Hence, merging a load into an existing entry for which the hazard information identifies a hazard could result in a hazard unnecessarily being signalled for the latest load, which could sometimes lead to false positive detections of scenarios when loads need to be re-issued. This can be avoided by suppressing merging of tracking information for one load into an entry already allocated for another load, when the hazard information identifies a hazard has been detected associated with that already allocated entry (even if the current load and the load associated with the already allocated entry relate to addresses in the same cache line). Hence, if a current load shares an address in the same cache line as a load tracked by an existing entry of the memory ordering tracking storage circuitry and that existing entry identifies that a hazard has been detected, the memory ordering tracking information for the current load is instead allocated to a different entry of the memory ordering tracking storage circuitry to the existing entry, without merging.

The memory ordering tracking information is not only useful for determining whether or not to re-issue load operations, but is also useful in determining whether there has been a disagreement with a memory ordering requirement in the first place. In some examples, an issued load operation is in disagreement with the memory ordering requirement when an issued load operation younger than a memory barrier instruction has been issued before an operation older than the memory barrier instruction.

The memory barrier may be an instruction or a sequence of instructions that requires other instructions to be executed in a certain order. For example, the memory barrier could be an instruction synchronisation barrier (ISB), a domain memory barrier (DMB), a data synchronisation barrier (DSB), or any other type of memory barrier. It should be noted that even when a memory barrier (or other memory ordering requirement) is determined to have been violated, loads younger than the barrier need not necessarily be re-issued. This determination of whether or not the instruction needs to be re-issued is made (e.g. based on the hazard information) separately to the determination of whether or not the memory ordering requirement has been violated.

In some examples, the memory ordering tracking storage circuitry comprises one or more entries, each associated with one or more issued load instructions; the memory ordering tracking information for each entry comprises hazard information indicative of whether a hazard has been detected for an address associated with that entry; and in response to a memory barrier instruction, the control circuitry is configured to control the load issuing circuitry to re-issue at least any load operations younger than the memory barrier when the memory ordering tracking storage circuitry comprises a given entry associated with a load operation younger than the memory barrier instruction and the hazard information of the given entry indicates that a hazard has been detected.

As noted above, a determination of violation of a memory barrier (or any other memory ordering violation) by one or more load operations does not necessarily mean that those operations need to be re-issued. If the data associated with the addresses referenced by those operations has not been altered since the operations were issued, then their results are correct. Thus, in this example, the load issuing circuitry is controlled to re-issue younger load operations than the barrier when the corresponding entry has hazard information indicates that a hazard has been detected. If none of the already issued load operations which are younger than the barrier have had a hazard detected, then the memory ordering violation can be tolerated. Thus, processing power is not wasted re-issuing instructions that are expected to be correct.

In some examples, the control circuitry determines that a load operation has been issued in disagreement with the memory ordering requirement when the issued load operation is younger than a further load operation specifying the same address as the issued load operation and has been issued before the further load.

More particularly, in some examples, the control circuitry is configured to determine that a load operation has been issued in disagreement with the memory ordering requirement when addresses of the further load operation and the issued load operation younger than the further load operation are in the same cache line.

As noted above, the determination of whether or not the instruction needs to be re-issued may be made separately to the determination of a disagreement with the memory ordering requirement. Thus, in some examples, the memory ordering tracking storage circuitry comprises one or more entries, each associated with one or more issued load instructions; the memory ordering tracking information for each entry comprises hazard information indicative of whether a hazard has been detected for an address associated with that entry; and in response to a given load operation, the control circuitry is configured to control the load issuing circuitry to re-issue at least any load operations younger than the given load operation when the memory ordering tracking storage circuitry comprises a given entry associated with a younger load operation than the given load operation that specifies an address in the same cache line as the given load operation, and the hazard information of the given entry indicates that a hazard has been detected.

In some examples, the memory ordering tracking information comprises merge information indicative of whether an entry is a merged entry associated with a plurality of load operations. This could, for example, be a single bit that is set to indicate that the entry is a merged entry, to distinguish from a non-merged entry which stores tracking information for a single load operation.

The merge information can be useful for determining whether it safe to flush entries of the memory ordering tracking storage circuitry after load operations have been flushed and are going to be re-issued. For example, when it is determined to re-issue the one or more issued load operations which are younger than a given flush point, the control circuitry may be configured to flush entries of the memory ordering tracking storage circuitry representing operations younger than the given flush point. In some examples, the control circuitry is configured to prevent a given entry of the storage circuitry representing an operation younger than the given flush point being flushed when the merge information indicates that said given entry is a merged entry. This avoids entries older than the flush point being flushed when they have been merged with younger instructions, thus losing their own age information. Thus, the correct execution of load operations is maintained despite the loss of the age information for some operations.

In some examples, when the given entry is prevented from being flushed, the control circuitry is configured to update the age information for the given entry to indicate the age of the youngest non-re-issued operation preceding the flush point. This approach is conservative, as the actual age of the load operation associated with the given entry may actually have been older than the age of the youngest non-re-issued operation preceding the flush point, but due to the merging, the actual age of that load would have been lost when the tracking information was merged with the information for the younger load prior to the flush being triggered. By setting the age information for the merged, non-flushed, entry to the age of the youngest non-reissued operation preceding the flush point (this youngest non-reissued operation may not even be a load operation), this ensures that at least any memory ordering violations which could cause incorrect processing results will be detected, to ensure compliance with the architectural constraints imposed. This could potentially lead to some false positive decisions to re-issue loads when not actually necessary, but this may be acceptable in order to enable the circuit area/power savings obtained by merging entries.

Particular embodiments will now be described with reference to the figures.

FIG. 1 shows an example of an apparatus in accordance with the present technique. In FIG. 1, load issuing circuitry 102 is configured to receive load operations 104 in a received order (for example, this could be an order specified by a program being run by the data processing apparatus) and issue them to a cache or memory 106. The load operations are each associated with an address in memory, from which data is to be fetched (possibly via a cache).

The load operations 104 may be issued by the load issuing circuitry 102 in an order different to the order in which they are received by the load issuing circuitry 102—that is, they may be issued out-of-order. Many processing systems support out-of-order execution of instructions such as this, however it is common for a number of ordering requirements to be specified by the system architecture. For example, a memory barrier such as an instruction synchronisation barrier (ISB), a domain memory barrier (DMB) or a data synchronisation barrier (DSB) may require that instructions younger than the barrier (e.g. instructions received by the load issuing circuitry later than the barrier) not be executed until after the barrier has been resolved. Also, some architectures may constrain that two loads to the same address should be handled in the order in which they are received. Thus, it is useful to be able to track issued load operations and their ages (age refers to the position in the received order).

To track issued load instructions, the data processing apparatus may be provided with memory ordering tracking storage circuitry 108. The memory ordering tracking storage circuitry 108, which may be in the form of a read-after-read (RAR) buffer, stores memory ordering tracking information for issued load operations, such as their ages. FIGS. 4 to 8 show an example of an RAR buffer.

Control circuitry 110 controls the memory ordering tracking storage circuitry 108, and is responsible for allocating and updating entries in the storage unit 108. The control circuitry 110 is also responsible for merging memory ordering tracking information for a plurality of different load operations into a single entry. This single merged entry might store tracking information for multiple load operations each associated with the same address in memory, with the same cache line, or with addresses that produce the same result when a predetermined hash function is applied to them. The merged memory ordering tracking information is therefore representative of one of the plurality of operations—for example, it could be the age of youngest operation.

In this way, a larger number of load operations can be tracked without needing to increase the number of entries in the memory ordering tracking storage circuitry. This, therefore, reduces the circuit area needed to track the larger number of operations. Also, power is saved, not only in the power consumed by the storage of the tracking information itself, but also in reducing the number of comparisons needed between the age/address of a current load and age/addresses of previously issued loads to detect whether memory ordering violations have occurred and if so whether it is needed to re-issue any previously issued loads.

Figure 2:
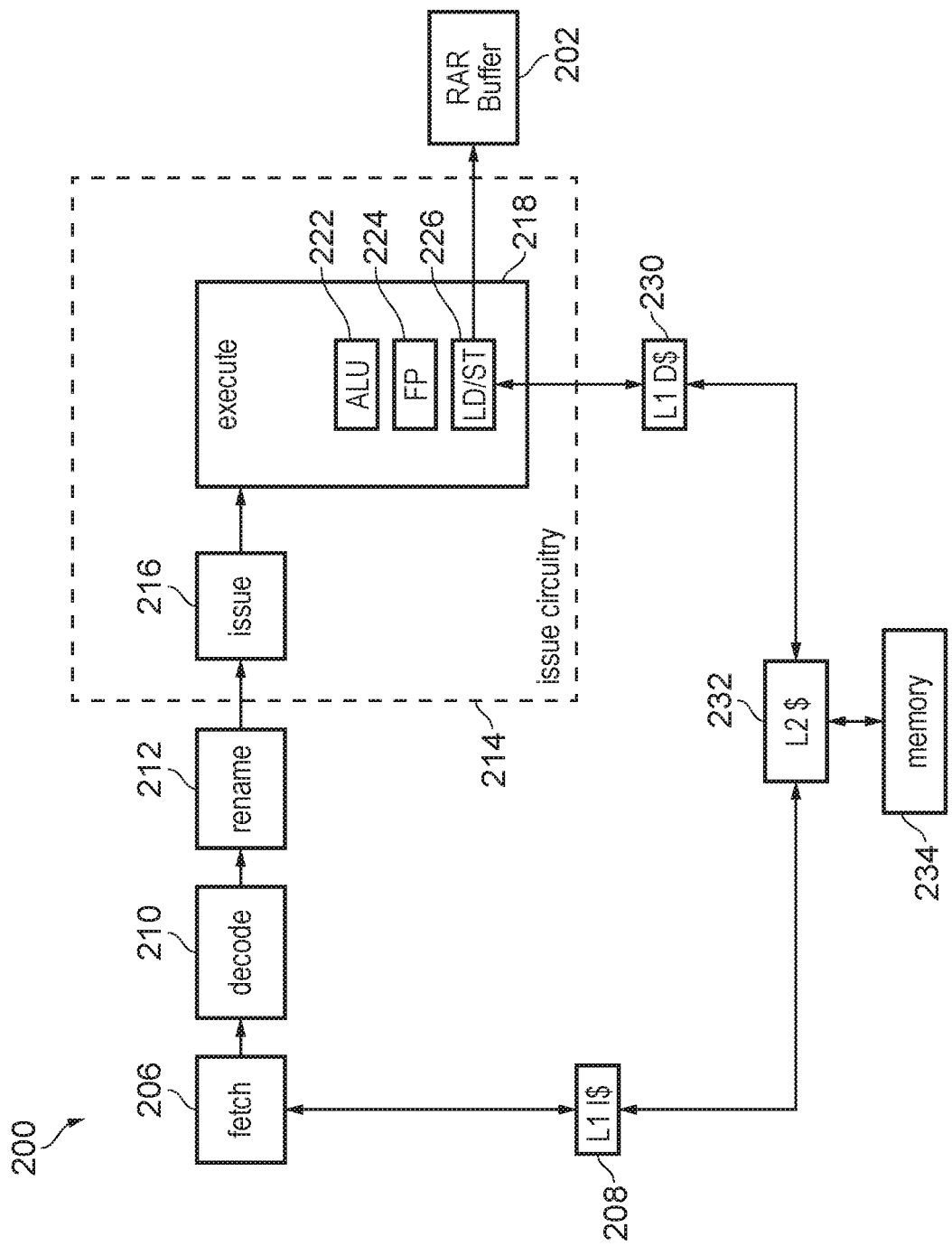
FIG. 2 is a block diagram schematically illustrating a processing apparatus in accordance with the present technique.

FIG. 2 shows an example of how memory ordering tracking storage circuitry—in this case an RAR buffer 202—can be implemented in a processing pipeline 200.

As shown in FIG. 2, a processing pipeline 200 comprises a number of pipeline stages. The pipeline includes a fetch unit 206, which fetches instructions from the instruction cache 208 or other memory structures 232, 234. The fetch stage 206 fetches the instructions identified by the fetch addresses, and a decode stage 210 decodes the fetched instructions to generate control information for controlling the subsequent stages of the pipeline.

A rename stage 212 performs register renaming to map architectural register specifiers identified by the instructions to physical register specifiers identifying registers provided in hardware. Issue circuitry 214 is an example of the load issuing circuitry 102 of FIG. 1, and includes an issue stage 216 and an execute stage 218. The issue stage 216 includes an issue queue which queues instructions awaiting execution until the required operands for processing those instructions are available in registers, and selection circuitry to select instructions for execution by the execute stage 218. The execute stage 218 executes the instructions to carry out corresponding processing operations.

The execute stage 218 may include a number of execution units such as an ALU (arithmetic logic unit) 222 for performing arithmetic or logical operations, a floating-point unit 224 for performing operations using floating-point operands and a load/store unit 226 for performing load operations to load data from a memory system to the registers or store operations to store data from the registers to the memory system. In this example the memory system includes a level one instruction cache 208, a level one data cache 230, a level two cache 232 which is shared between data and instructions, and main memory 234, but it will be appreciated that this is just one example of a possible memory hierarchy and other implementations can have further levels of cache or a different arrangement. It will be appreciated that the pipeline shown in FIG. 2 is just one example and other examples may have different sets of pipeline stages or execution units. For example, an in-order processor may not have a rename stage 212.

RAR buffer 202 is an example of the memory ordering tracking storage circuitry 108 of the present technique, and comprises a plurality of entries, each representing one or more load operations that have been executed by the load/store unit 226. Each entry stores memory ordering tracking information for its associated load operation or load operations, which may include an address identifier identifying an address of a cache line associated with the corresponding load operations, age information indicative of a position of load operations in the program order (the order in which they are received by the issue circuitry 218) and hazard information indicative of whether data at the address associated with one of the load operations may have been altered. An example of an RAR buffer will be described in more detail below, with reference to FIGS. 4 to 8.

Figures 3, 4:
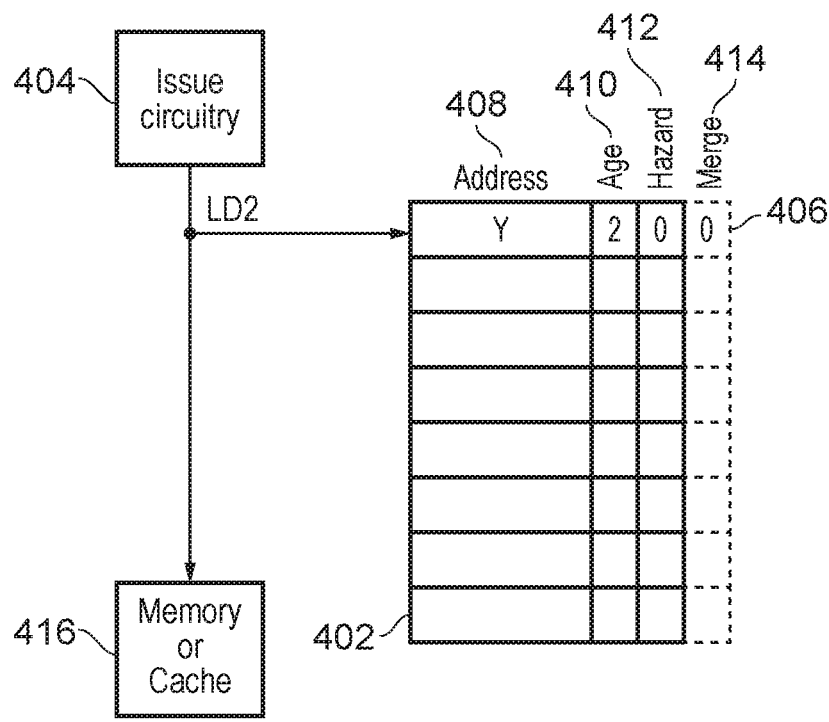
FIG. 3 is a diagram illustrating a series of load instructions to be issued by load issuing circuitry.
FIGS. 4 to 7 schematically illustrate allocation and updating of entries in memory ordering tracking storage circuitry.

FIG. 3 illustrates a series of load operations. At the top of FIG. 3, a series of four load operations are shown in the received order (the order in which the instructions are received by the load issuing circuitry), with their ages shown to their left. For example: LD1 is an operation to load data from address A, and has age 1; LD2 is an operation to load data from address B, and has age 2; LD3 is an operation to load data from address C, and has age 4; LD4 is an operation to load data from address D, and has age 5. As can be seen from the right hand side of the Figure, the addresses A, B, C and D are each made up of multiple portions. For example, each may be made up of a base address and an index. In the example shown, addresses B and D share a number of bits (address portion "Y"), but differ from each other by the latter portion of bits "b" or "d". Further, in this example, address A is made up of a first portion of address bits "X" and a second portion of address bits "a" and address C is made up of a first portion of address bits "Z" and a second portion of address bits "c". In the Figure, this is represented for each address as a sum of the two portions of address bits (e.g. A=X+a); however, it should be noted that this does not necessarily mean that the address is a sum of these bits—the two portions of the address could be combined in some other way.

It should be noted that many processing systems operate on a per-cache-line basis, with each cache line referring not to a whole address, but to only the first portion of address bits. Thus, in this example, addresses B and D may refer to the same cache line (as they both share first portion Y), even though they do not refer to the same precise location in memory.

Also shown is a data synchronisation barrier (DSB), with age 3. The DSB is an example of an instruction which imposes a memory ordering requirement, and indicates that any load instructions younger than it (i.e. any instructions with an age value greater than 3) should not be issued ahead of operations received before the DSB. One way of achieving this is not to issue LD3 and LD4 until after the DSB has been resolved, however this can reduce performance as it is possible that if LD1 or LD2 is stalled, this delays handling LD3 or LD4 even if they could have executed. By allowing LD3 or LD4 to issue ahead of LD1 or LD2 (in violation of the memory ordering requirement), but checking using the memory ordering tracking storage circuitry 108 whether this violation is problematic, this can improve performance in some cases by avoiding unnecessarily delaying certain loads to satisfy memory ordering requirements. If a memory ordering requirement is disagreed with, and it is detected that this violation does pose a risk of changing the results of the loads because a hazard has arisen indicating that the data in the relevant addresses may have changed, then the later load can be reissued to ensure architecturally correct results, but if no hazard has arisen then there is no need to re-issue and processing may continue despite the disagreement with the memory ordering requirement.

Hence, even though the barrier DSB imposes a memory ordering requirement, as shown at the bottom of FIG. 3, the execution order may be different to the received order and may allow for violation of the memory ordering requirement. In this example, LD2 is issued first, then LD4, then LD1, then the DSB and then LD3. This means that LD4, which has an age of 5, is issued before the DSB (which has an age of 3) has been resolved, and before LD1 which is older than the barrier, disagreeing with the memory ordering requirement.

The detection of whether the memory ordering requirement can be tolerated is made using the memory ordering tracking storage circuitry such as an RAR buffer. FIGS. 4 to 8 show how entries can be allocated and maintained in an RAR buffer 402.

When a load operation is issued by load circuitry 404, if there is no existing entry in the RAR buffer for the cache line corresponding with that load operation, the control circuitry allocates a new entry. FIG. 4 shows allocation of an entry 406 to an RAR buffer 402 following the issuing of LD2 by the issue circuitry 404 to the memory system 416.

Each entry in the RAR buffer 402 has an address field 408, storing the first address portion of the address of the associated load operation, an age field 410, storing the age of the operation, a hazard field 412 and a merge field 414.

The address field stores a portion of the address of the associated load operation; by storing only the first portion of address bits, each entry in the RAR buffer is associated with a single cache line (bits of the address which distinguish different addresses within the same cache line do not need to be stored in the address field).

The age information indicates the position of an associated load in the received order; in this example, a higher age value indicates a younger operation, but it will be appreciated that the age may be represented differently. While for conciseness, in FIG. 3 the age of the 5 instructions is identified using consecutive integers 1-5, but this is just for explanatory purposes. For example, in some cases each operation processed in the pipeline may be associated with an operation identifier which is allocated in program order, and that operation identifier may be used as the age identifier. As operations other than loads and barriers may occur and be allocated operation identifiers, not just loads and barriers, this means that the sequence of age identifiers seen by the control circuitry 110 associated with the memory ordering tracking storage circuitry 108 is unlikely to be consecutive.

The hazard field 412 stores an indication of whether a hazard event—for example, an event which may have altered the data stored at the address associated with the load operation—has occurred. For example, a hazard associated with address Y may be detected if a snoop message is received indicating that a potential write to address Y has occurred (or will occur) somewhere in the memory system. In this example, a hazard value of "0" indicates that no hazard has been detected, and a value of "1" indicates that a hazard event has been detected. It should be noted, however, that other ways of representing the hazard information are also possible.

The merge field 414, meanwhile, stores a merge value indicative of whether or not the entry stores merged tracking information for a plurality of load operations. In this example, a value of "0" indicates that the entry is only associated with a single load operation, and a value of "1" indicates that the entry is associated with a plurality of entries. As can be seen from the use of dotted lines in the figure, the merge field is optional.

The age information, hazard information and merge information are all examples of memory ordering tracking information, and the RAR buffer 402 is an example of memory ordering tracking circuitry.

The entry 406 allocated for LD2 therefore has an address value of "Y", an age of "2", a hazard bit "0" and a merge bit "0".

Figure 5:
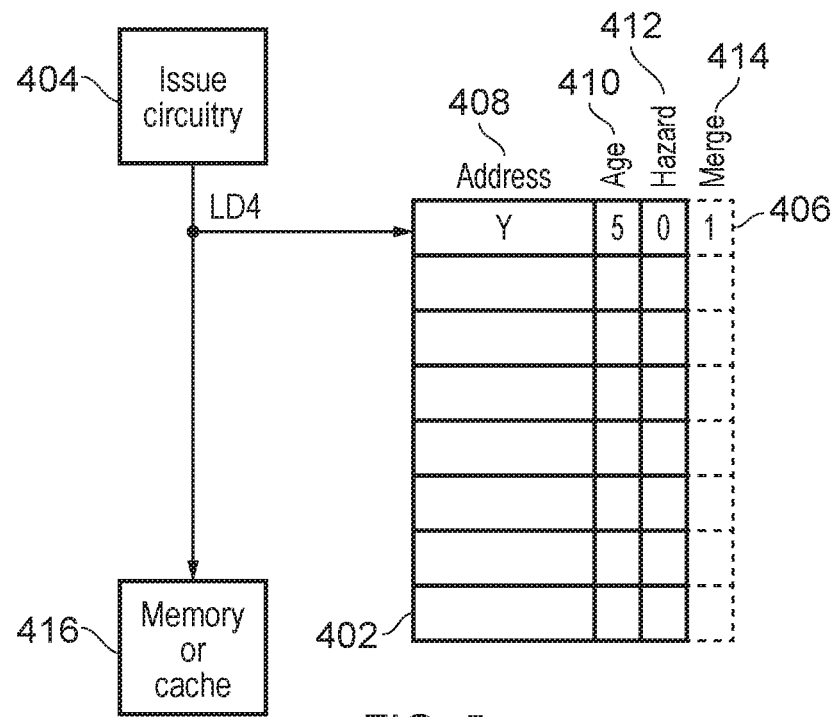

When a load operation addressing the same cache line as an existing entry in the RAR buffer is issued by the issue circuitry, and the merge field 414 has not been set to indicate that the existing entry stores merged tracking information, the memory ordering tracking information for the new load and any loads already represented by the buffer entry is merged. FIG. 5 shows how the RAR buffer 402 is updated following issuing of LD4. In the example shown in FIG. 5, LD4 is issued by the issue circuitry 404 to load data from address D=Y+a in memory or a cache 416. The address D shares its first portion Y with LD2, for which an entry 406 in the RAR buffer 402 has already been allocated.

In this situation, since LD2 and LD4 are directed to the same cache line, the control circuitry (not shown) is configured to merge the tracking information for these two loads into a single entry in the RAR buffer 402, providing the existing entry 406 does not have its hazard bit 412 set. Thus, instead of allocating a new entry for LD4, the control circuitry instead updates the age field 410 for the entry 406 to the age of the youngest of the two loads; therefore, the age is updated in this case to "5". In addition, since this entry 406 is now a merged entry, the merge bit 414 is set to "1". Thus, the memory ordering tracking information for two load operations is merged into a single entry in the RAR buffer.

In this way, the number of entries needed in the RAR buffer 402 to store tracking information for a given number of loads is reduced, reducing the circuit area taken up by the buffer, as well as saving power. By setting the age to that of the youngest load, more memory ordering violations can be identified (see FIG. 8).

Figure 6:
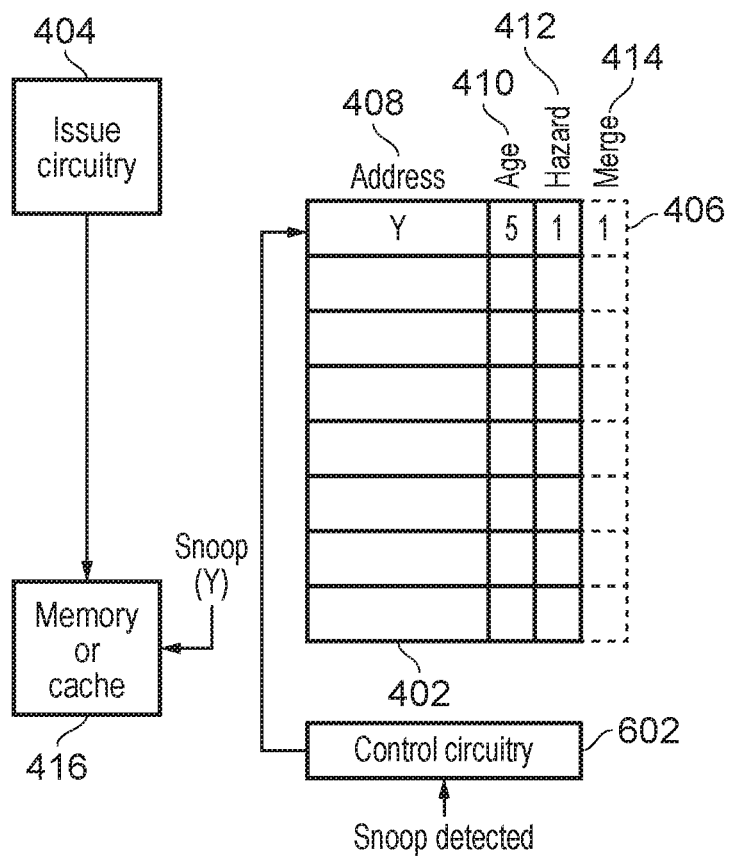

The hazard field 412 identifies whether a hazard has been detected for the cache line associated with a given entry. FIG. 6 shows how the apparatus responds to the detection of a snoop specifying an address of an entry in the RAR buffer 402.

In the example shown in FIG. 6, a snoop directed to cache line Y is detected by the control circuitry 602, where a snoop is a message transmitted between caches to indicate that the data at a given address in memory may have been altered. Therefore, a snoop is an indication of a hazard.

In response to detecting the snoop, the control circuitry 602 is configured to update the hazard bit 412 of the entry 406 to a "1", to indicate that a hazard has been detected for that cache line.

Figure 7:
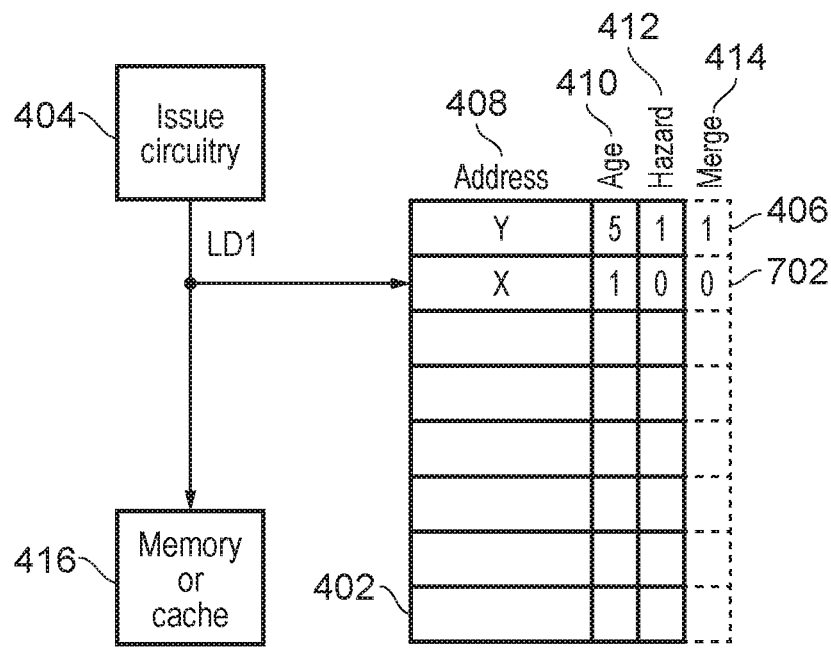

FIG. 7 shows an example of allocating a second entry 702 to the RAR buffer 402. In this example, LD1 is issued by the issue circuitry 404 to the memory or cache 416. LD1 specifies address A=X+a, which does not refer to the same cache line as the entry 406 already allocated to the RAR buffer 402. Therefore, the control circuitry is configured to allocate a new entry 702, with address bits X, age "1", hazard "0" and merge "0".

Figure 8:
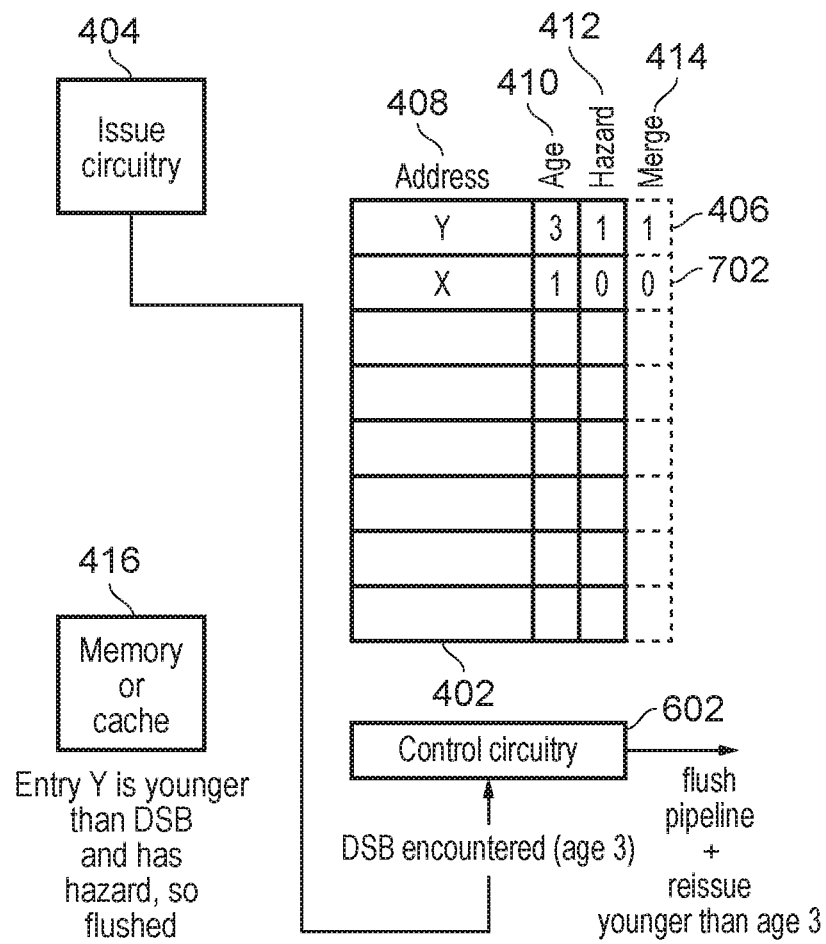
FIG. 8 is a diagram illustrating how the apparatus of the present technique may respond to encountering a memory barrier instruction.

The RAR buffer can be used to determine whether any load operations have been issued in disagreement with a memory ordering requirement, and also to determine whether or not to flush those entries from the buffer. FIG. 8 shows an example of how the RAR buffer 402 and control circuitry 602 might react to encountering a domain synchronisation barrier (DSB).

In the example shown, a DSB with age 3 is issued by the issue circuitry 404. In response, the control circuitry 602 checks the RAR buffer 402 for any entries which are younger than the DSB and have their hazard bit 412 set. In this example, the first entry 406 is younger (age 5) than the DSB and has its hazard bit 412 set (indicating that the data at that address location may have been altered since the entry was allocated); therefore, the control circuitry 602 sends control signals to trigger the pipeline to flush and to re-issue any load operations younger than age 3. At this point, it would be safe to flush from the RAR buffer 402 any entries which are not merged and relate to a load operation which has been flushed and will be re-issued. For example, if the entry for address Y had not been merged, it would have been acceptable to flush it because it has age 5 and so it is younger than the flush point 3 and so another entry would be allocated later when the re-issued load of age 5 is executed again. However, as in fact the merge bit 414 was set for the entry for address Y, this means that the load of age 5 was merged with the load of an older age, so it cannot be known whether or not that older load was older or younger than the flush point (age 3). In fact, in this example the older load was of age 2 and so it is correct not to flush it, but in any case due to the merging this cannot be known once the ages have been merged, so it is safest not to flush merged entries even if their age is younger than the flush point. In this way, the flushing of operations is speculative, in that some operations are flushed while others are not. To prevent unnecessary re-issuing of the loads after issuing resumes after the flush, when the flush is triggered and the entry for address Y is prevented from being flushed, the age indication 410 of that entry may be set to 3, the age of the flush point representing the youngest non re-issued operation (in this case the age of the DSB). Also, the second entry 702 for address X is older than the DSB, so is not flushed.

Entries can also be removed from the RAR buffer once the commit point (representing the last known functionally correct point of execution reached by the execution of the program) has overtaken the age indicated in that entry. Hence, once it is known that any speculation has been resolved as correct at a given point of program execution, and any potential memory ordering violations occurring up to that point have been tolerated without hazards being detected, then an entry with an age indicator older than the commit point can be invalidated or overwritten.

In this way, age information 410 and hazard information 412 of the entries in the RAR buffer 402 is used to determine whether it is necessary to flush and re-issue load operations due to memory ordering violations being detected in the presence of a hazard for the relevant address. The age information 410 is used to identify whether or not any of the entries violate the memory ordering requirement (caused by the DSB—in this example, one of the loads represented by the first entry 406 violated the DSB by being issued before the DSB was resolved, despite being younger). Because the age 410 is set to be that of the youngest load of the merged loads, it is ensured that no violating loads are missed by the control circuitry.

The hazard information 412, by identifying whether or not the data at that location may have been altered, allows the control circuitry 602 to determine whether it needs to flush the current load from the pipeline. In some circumstances, if the hazard information 412 is set to "0", the control circuitry may determine not to flush that load even if it does violate the DSB, because the load is still guaranteed to be correct. Thus, further power savings can be achieved by not flushing and re-issuing entries that are guaranteed to be correct.

DSBs are not the only form of instruction which may impose a memory ordering requirement. Some architectures may require that when two loads to the same address are executed, the older load in the program order should be issued before the younger load. However, in practice the addresses of the loads may be calculated based on operands specified by the load instructions, and if the operands for the younger load are available before the operands for the older load, it may be more efficient to issue the younger load anyway, even if it is not yet known whether it specifies the same address as an older load. Hence, another source of memory ordering requirement can be that an older load is issued after a younger load specifying the same address.

Figure 9:
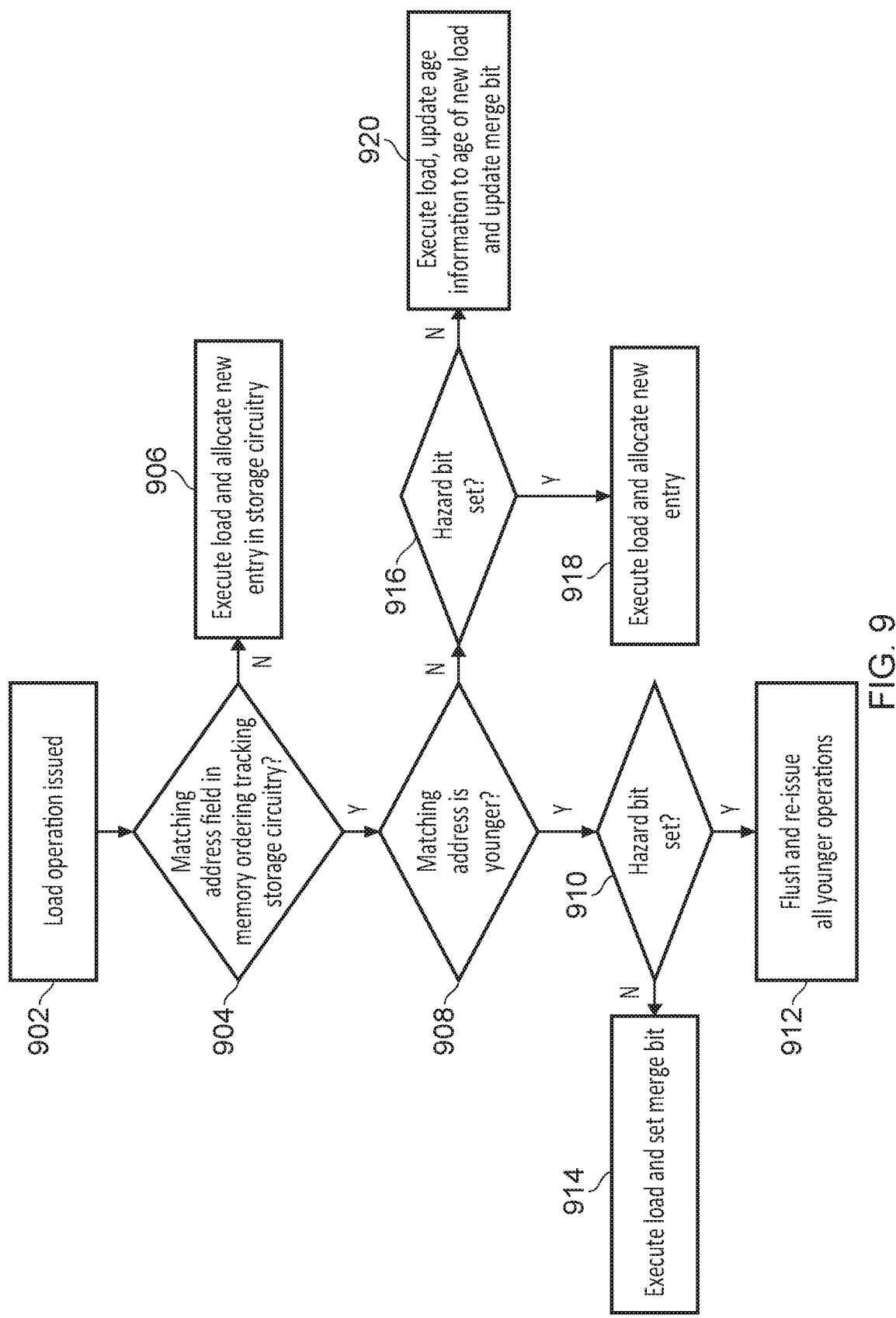
FIG. 9 is a flow diagram illustrating a process carried out in response to the issuing of a load instruction.

FIG. 9 is a flow diagram showing a method carried out when a load operation is issued, to check for potential problems caused by memory ordering violations involving multiple loads to the same address. Note that, as the memory ordering tracking storage circuitry tracks addresses at the granularity of cache lines, the checking is conservative as it may detect a violation between loads which actually relate to different addresses in the same cache line. As hazard detection may be based on snoop requests issued at granularity of cache lines anyway, then as it may not be possible to attribute a hazard to any particular address within a cache line, there may be little benefit to tracking addresses more precisely than cache line granularity in the memory ordering tracking storage. In practice, as hazards may be relatively rare, detecting an occasional false positive memory ordering violation between loads which actually relate to different addresses in the same cache line does not provide a significant impact on performance, as it is only when a hazard is detected that this would cause flushing and reissuing of loads.

In step 902, a load operation is issued by load issuing circuitry, to load data from memory. Following issuing of the load, the control circuitry checks 904 whether there is an entry in the memory ordering tracking storage circuitry identifying the same address (or cache line or hash) as that of the issued load. If there is not a matching entry (N), in step 906, the load operation is executed and a new entry is allocated in the memory ordering tracking storage circuitry, specifying the address (or cache line or hash) of the load and its age, and initially indicating that no hazard has been detected and that the entry is a non-merged entry.

On the other hand, if a matching entry was identified (Y), the method proceeds to a step 908 of checking, by the control circuitry, whether the age of that matching entry is younger than the age of the issued load operation. This check is carried out by checking the age field of the entry, as shown in FIGS. 4 to 8.

If the control circuitry determines that the matching entry is younger than the issued load (Y), the control circuitry next checks 910 if the hazard bit is set. If the hazard bit is set (Y), the control circuitry performs a step 912 of flushing the pipeline and re-issuing operations from the point of execution corresponding to the oldest guaranteed load guaranteed to have executed correctly. This is because the hazard bit indicates that the data at the address identified by the matching entry may have been altered, meaning that the memory ordering violation indicated by the fact that another load to the same address as the current load may risk architecturally incorrect results.

On the other hand, if it was determined at step 910 that the hazard bit was not set (N), the method proceeds to a step 914 of executing the load and setting the merge bit for the matching entry to "1". In this case, the age field does not need to be updated, since the age of the matching entry is already that of the youngest load that will be represented by that entry following the merge. Also, in this case, if the hazard bit was not set, there is no need to flush and re-issue any loads, as even though a memory ordering violation occurred, as no hazard has been flagged then this violation does not cause incorrect results and can be tolerated. Hence, performance can be improved by permitting the incorrect ordering of the loads as the result is the same as would have been achieved if the loads were issued in the architecturally correct order.

Returning to step 908, if it was determined at this stage that the age of the matching entry was older than that of the issued load operation (N), the method would similarly proceed to a step 916 of checking whether the hazard bit is set. If the hazard bit is set (Y), the method proceeds to a step 918 of executing the load operation and allocating a new entry. In this case, the existing entry does not need to be flushed and the corresponding load does not need to be re-issued, since as the earlier issued load was older than the current load, there has been no memory ordering violation. However, as the hazard bit is set, a new entry is allocated rather than merging the tracking information for the issued load into the existing entry. This is because merging the tracking information in this instance would force the younger load to inherit the hazard bit from the older load, potentially leading to a waste of processing power in re-issuing the younger load if the entry is flushed at a later stage. This is unnecessary because as the younger load has been issued after the hazard bit was already set, it will anyway observe the update to the data at the specified address that was caused by the memory access which triggered the hazard bit to be set, and so will be correct.

Returning to step 916, if the hazard bit was not set (N), the method proceeds to a step 920 of executing the load operation, updating the age information of the matching entry to the age of the issued load, and updating the merge bit. Thus, in this circumstance, the tracking information for multiple loads is merged into a single entry. This enables a smaller number of entries to be provided in the memory ordering tracking storage circuitry, for accommodating a given size of issue queue, compared to if merging was not supported.

It should be noted that although the steps in the flow diagram of FIG. 9 are shown in a particular order, the method is not restricted to being executed in that order. For example, steps 908, 910 and 916 show checking for a matching address (step 908) before checking whether the hazard bit is set (steps 910 and 916), but there is no reason that these steps can't be carried out in the opposite order, checking the hazard bit before checking the address.

Figure 10:
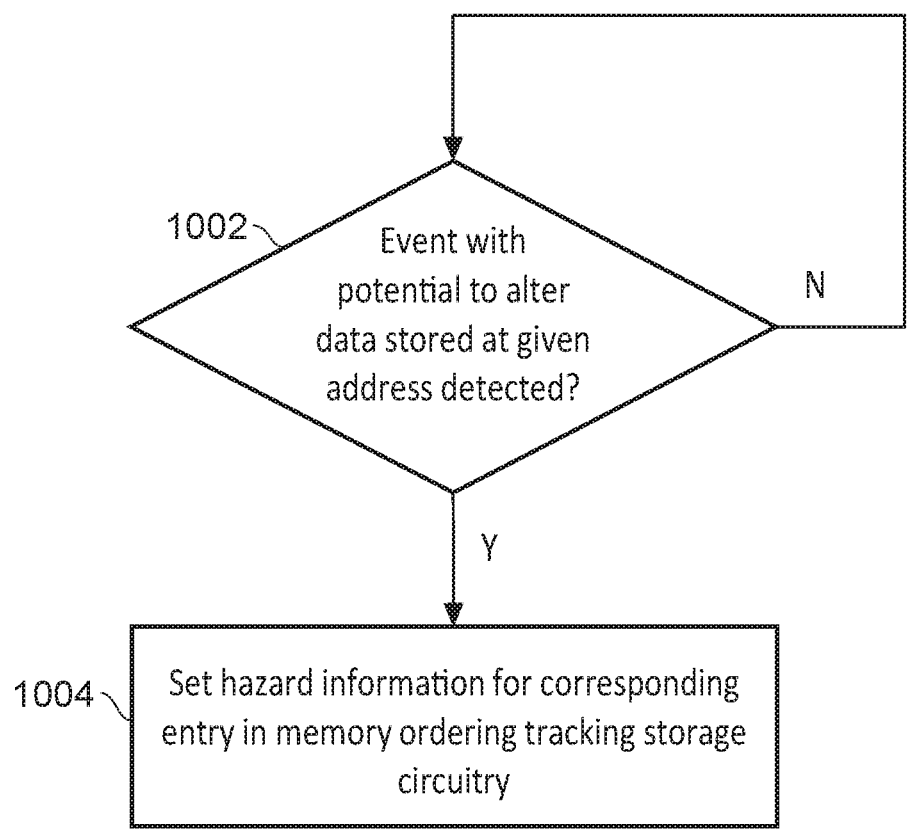
FIG. 10 is a flow diagram illustrating a process of setting hazard information in an entry of memory ordering tracking storage circuitry.

FIG. 10 is a flow diagram illustrating how the apparatus of the present technique may respond to a hazard. In step 1002, the control circuitry waits for an event with potential to alter data stored at a given address. Once such an event has been detected (Y), the control circuitry is configured to set the hazard information for the entry associated with that address to indicate that the hazard has been detected. For example, as illustrated in FIGS. 4 to 8, this may involve setting the hazard information to "1".

Figure 11:
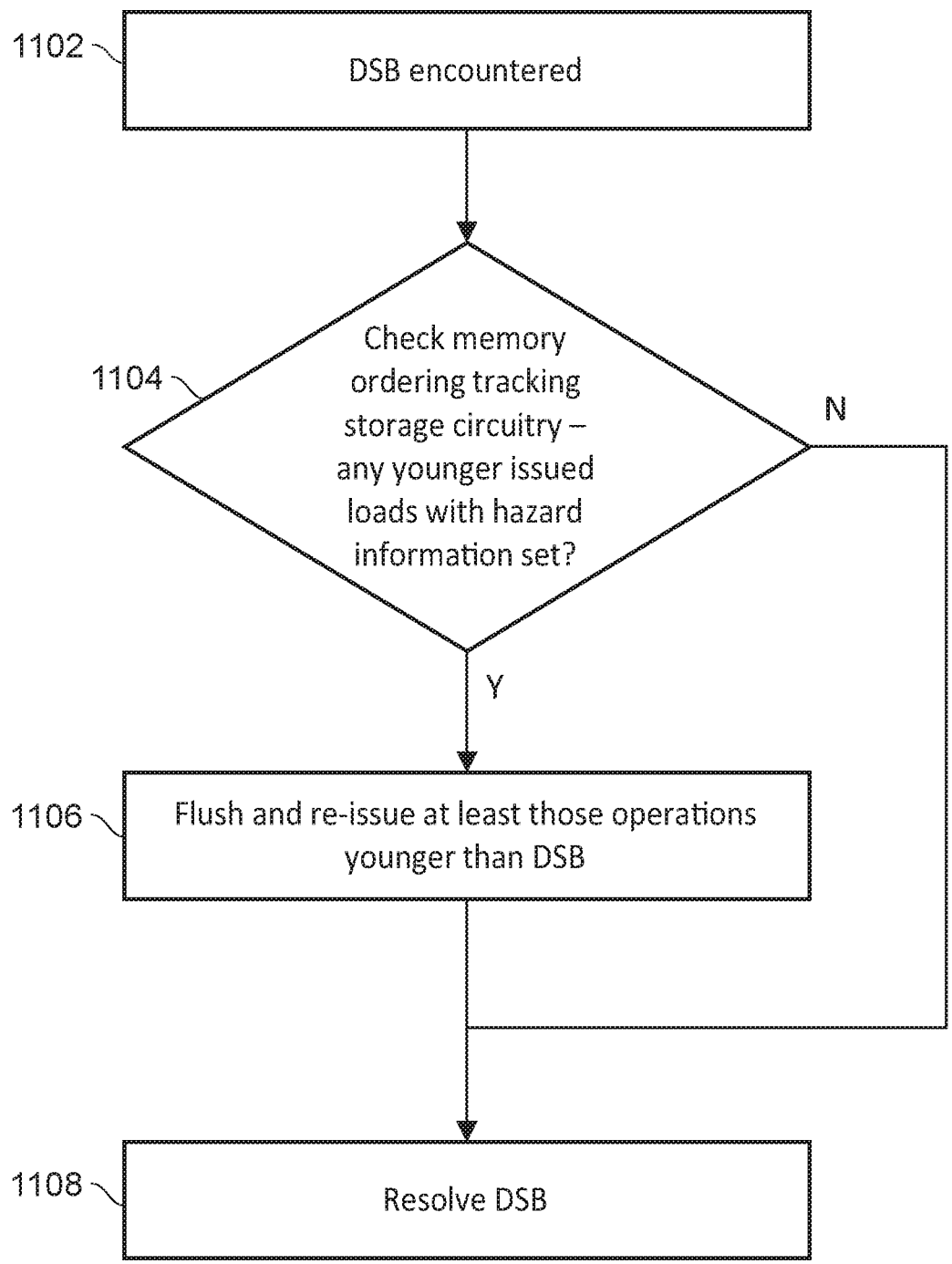
FIG. 11 is a flow diagram illustrating a process carried out in response to a memory barrier instruction being encountered.

FIG. 11 is a flow diagram illustrating how the apparatus of the present technique may respond to a domain synchronisation barrier (DSB). The method starts with a step 1102 of encountering a DSB. The DSB may be issued by the load issuing circuitry or by some other issuing circuitry, and may be detected by the control circuitry.

When the DSB is encountered, the control circuitry is configured to perform a step 1104 of checking the memory ordering tracking circuitry for any younger load operations with their hazard bits set. If no such entries are identified (N), the method proceeds directly to a step 1108 of resolving the DSB. On the other hand, if such an entry was identified, the method first proceeds to a step 1106 of flushing from the execution pipeline, and re-issuing, at least the identified operations which are younger than the barrier—the process by with these entries are flushed and re-issued is discussed in more detail with reference to FIG. 12.

After flushing the necessary entries, the method continues to the step 1108 of resolving the DSB.

Figure 12:
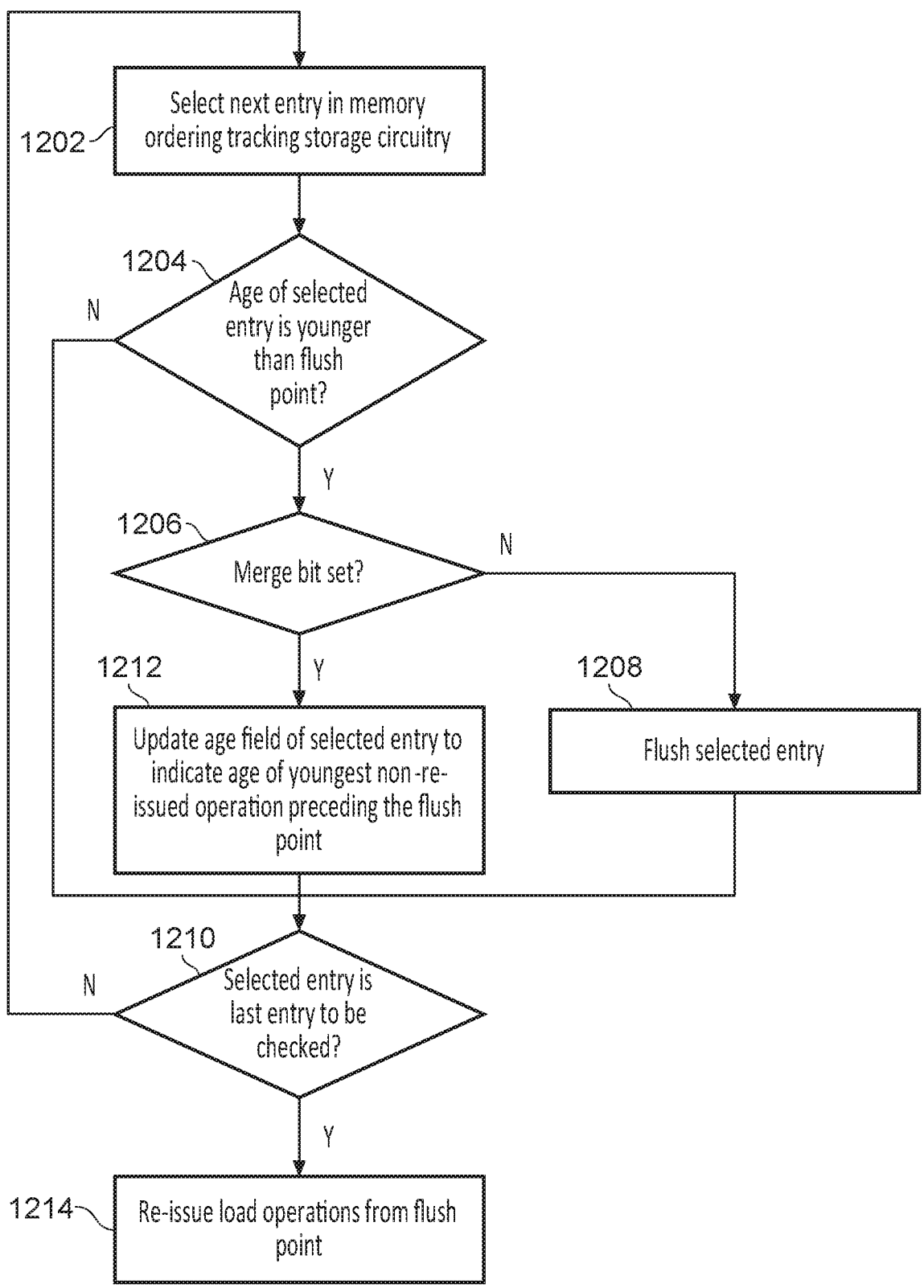
FIG. 12 is a flow diagram illustrating a process of flushing entries from memory ordering tracking storage circuitry.

FIG. 12 is a flow diagram illustrating flushing of entries from the memory ordering tracking storage circuitry, when it is determined to flush operations from the pipeline due to a hazard affecting a memory ordering violation detected based on the RAR buffer. The flushed operations are the operations starting from a given flush point (e.g. from a given age).

Following a decision to flush operations from the pipeline, the control circuitry performs a step 1202 of selecting an entry in the memory ordering tracking storage circuitry. The control circuitry checks 1204 whether the age of this entry is younger than the flush point and, if it is (Y), checks 1206 whether the merge bit is set. If the selected entry is younger than the flush point and does not have its merge bit set (N), the selected entry is flushed 1208, and the method proceeds to a step of checking 1210 if the selected entry is the last entry to be checked. The non-merged entry younger than the flush point can be flushed, because the corresponding operation will be re-issued by the pipeline at which point another entry will be allocated again, so even if a hazard has already been detected for that entry, this is not a problem as the re-issued load will observe the result of the memory write which caused the hazard to be detected. Flushing the non-merged entry younger than the flush point therefore improves performance by avoiding unnecessary detections of hazards for re-issued instructions.

Returning to step 1206, if the selected entry is younger than the flush point and does have its merge bit set (Y), the entry is not flushed. Instead, in a step 1212, the age field of the entry is updated to indicate the age of the youngest non-re-issued operation preceding the flush point. This ensures architectural correctness. The fact the entry was merged means there could have been an operation older than the flush point which was merged in that entry, and whose entry would need to be retained if so, but due to the merging it cannot be known for sure whether the merged load was older or younger than the flush point. By setting the age to the youngest non-reissued operation, which may or may not actually correspond to a load operation, rather than leaving the age of the merged entry as the age of a younger operation than the flush point, this avoids some unnecessary flushes caused by some false positive memory access violation detections, but nevertheless to guarantee architectural safety some false positives may still be possible. The method then proceeds to the same step 1210 of checking whether the selected entry is the last entry.

Returning to step 1204, if it was determined at this step that the age of the selected entry was older than the flush point (N), the method proceeds straight to the step 1210 of checking whether the selected entry is the last entry to be checked. Older entries cannot yet be flushed from the RAR buffer because it is possible that there could still be another, non-reissued, load which is even older that is still in the issue queue awaiting issue, and for which the comparison with the older RAR buffer entry will be needed to check whether memory ordering violations are subject to hazards.

Once the method arrives at step 1210, the control circuitry checks whether the selected entry is the last entry to be checked. If it is the last entry, the method proceeds to a step 1214 of re-issuing load operations from the flush point. On the other hand, if the selected entry was not the last entry to be checked, the method returns to the step 1202 of selecting the next entry in the memory ordering tracking storage circuitry.

Figure 13:
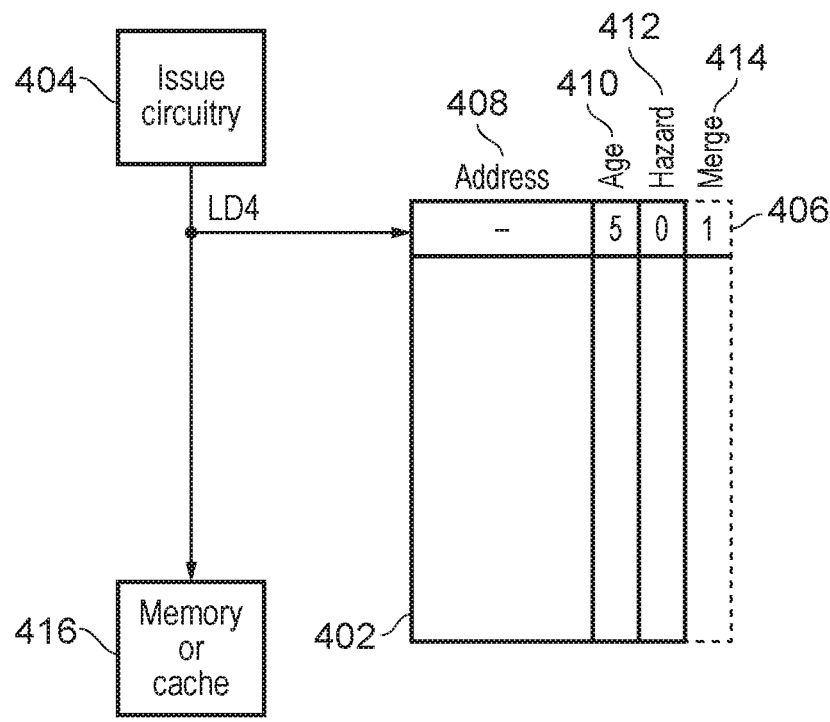
FIGS. 13 and 14 schematically illustrate examples of using a single entry to store memory ordering tracking information for all issued load operations.

In the above examples, the memory ordering tracking information for multiple issued load operations is merged based on the addresses of the operations. However, in some examples, the memory ordering tracking information for all issue load operations may be merged into a single entry. FIG. 13 shows an example of how this may be implemented.

In FIG. 13, issue circuitry 404 is shown issuing a load operation LD4 to the memory or cache 416. In this example, it is assumed that no hazards have been detected for issued load operations for a predetermined period of time; thus, the RAR buffer 402 has been collapsed to a single entry. In other words, to save energy, only one entry 406 of the RAR buffer is being used.

In the example shown in FIG. 5, the same memory ordering tracking information is stored—in particular, the age 410, the hazard field 412, and a merge bit 414. However, all this information is merged for all issued load operations. In particular, the address field may not be updated, since there is no need for the address to be recorded when all issued loads are represented by a single entry. Moreover, the hazard field 412 for the merged entry will be set to represent whether a hazard has been detected for any issued load operations, and the age bit 410 may be set to indicate of the youngest load issued by the issue circuitry 404 so far.

It may seem counter-intuitive to merge so many load operations into a single entry. However, the inventors realised that, in many systems, it is very rare for a hazard to be detected. Therefore, the efficiency improvements achieved by storing the memory ordering tracking information for all issued load operations in a single entry outweigh any losses due to needing to re-issue a much greater number of load operations in the event of a flush occurring.

The single-entry mode illustrated in FIG. 13 may be just one of a number of modes, and the control circuitry may be configured to switch between the single-entry mode and a multiple-entry mode in which memory ordering tracking information is stored across multiple entries, depending on how frequently hazards are detected. The multiple-entry mode may include the examples depicted in FIGS. 4 to 8, or may include a mode in which no merging of memory ordering tracking information occurs. The switching between modes will be described in more detail with reference to FIG. 15.

Figure 14:
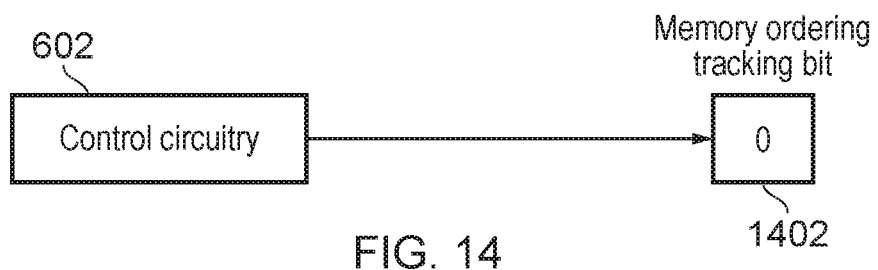

While the single-entry mode may make use of a single entry 406 of an RAR buffer 402, in some examples the single entry may be represented by a single bit 1402, as depicted in FIG. 14.

In the example shown in FIG. 14, a single bit 1402 indicates whether a hazard has been detected for any issued load operations. Since no addresses are tracked in the example of FIG. 14, a hazard is, in this case, detected when any snoop or write is detected from another master, which could indicate that data relating to a tracked load may have been altered. If the memory ordering tracking bit 1402 indicates that a hazard has been detected, all operations younger than a given age (e.g. all operations issued after a predefined flush point, indicating the last known correct point of operation) are flushed. This means that, in cases when a hazard is detected, a much greater number of issued load operations are flushed than may be the case where multiple entries are used to record the memory ordering tracking information (as in this case, all external memory updates are detected as a potential hazard, even if no issued load at the master associated with the control circuitry 602 actually accessed that address, and even if there was no memory ordering requirement at all, or no disagreement with any memory ordering requirement that did arise). However, provided that hazards are rare, collapsing the RAR buffer 402 down to a single bit 1402 provides significant efficiency improvements in terms of the power cost of updating and looking up the tracking buffer. Note that the tracking bit 1402 shown in FIG. 14 may be provided in addition to a buffer 402 such as the examples shown above, with the tracking bit 1402 used in a single-entry mode, and the buffer 402 used in other modes.

Figure 15:
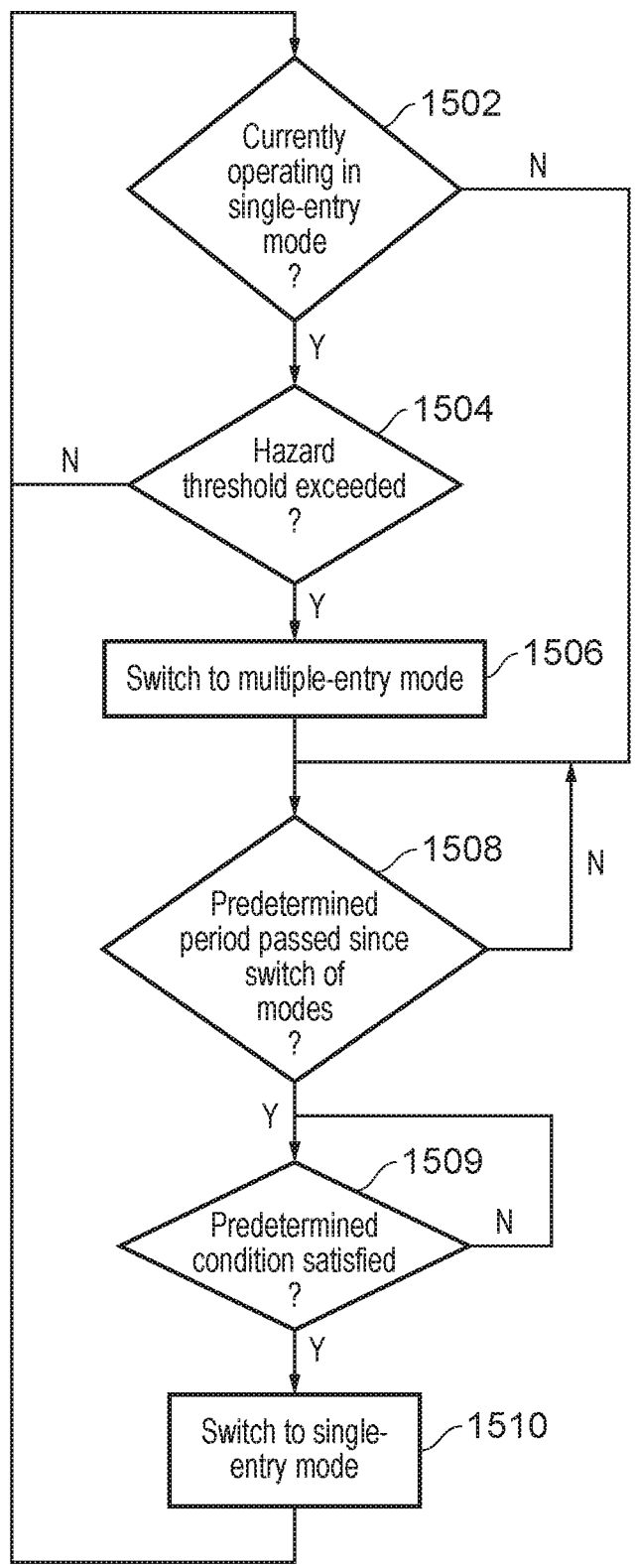
FIG. 15 is a flow diagram illustrating switching between modes of the memory ordering tracking storage circuitry.

FIG. 15 is a flow diagram illustrating how the control circuitry 602 may switch between the single-entry mode described with reference to FIGS. 13 and 14, and a multiple-entry mode.

In a step 1502, it is determined whether the system is currently operating in a single-entry mode or a multiple-entry mode. If the system is currently operating in the multiple-entry mode, the method proceeds to step 1508. However, when operating in a single-entry mode, the method proceeds to a step 1504 of determining whether a hazard threshold has been exceeded. The hazard threshold may be, for example, a predetermined number or rate of hazards being detected in a predetermined period (e.g. a threshold frequency at which hazards are detected). If no hazard has been detected, the method returns to step 1502. However, if exceeding the hazard threshold is detected, at step 1506 the processing circuitry is configured to switch from the single-entry mode to the multiple-entry mode. In some examples, the hazard threshold may be the detection of any hazards in any period, such that if any hazards are detected, the method moves on to step 1506. In other examples, the threshold may be set to be a little higher, so that a given number of hazards in a predetermined period are permitted, and if this number is exceeded, the method proceeds to step 1506.

While operating in the multiple-entry mode, it is determined at step 1508 whether a predetermined period (for example, this could be a predetermined number of processing cycles) has passed since switching from the single-entry mode to the multiple-entry mode. If not, the method returns to step 1508, so it is not possible to switch back to the single-entry mode until at least the predetermined period has elapsed; however, if the predetermined period has passed without a hazard being detected, the method proceeds to a step 1509 of determining whether a predetermined condition has been satisfied. For example, the predetermined condition may be that the number or rate of hazards detected is less than a predefined threshold, or that a predetermined period has elapsed since the last detection of an access to shared memory or the last detection of a hazard. Other examples of a predetermined condition may also be applied. If it is determined at step 1509 that the predetermined condition has not been satisfied, step 1509 repeats. If it is determined that the predetermined condition has been satisfied, the method proceeds to a step 1510 of switching to the single-entry mode. The method then returns to step 1502.

According to the examples described above, memory ordering tracking storage circuitry for storing tracking information for issued load operations has been described. The memory ordering tracking storage circuitry may be in the form of an RAR buffer, and each entry stores information such as an age of its associated load operation, hazard information identifying whether an event capable of altering the data stored at the associated address in memory has been detected and, optionally, merge information indicating whether the entry is a merged entry.

Control circuitry operating the RAR buffer is capable of merging this tracking information for multiple loads into a single, merged entry, for example if the load operations are addressed to the same cache line. This allows more load operations to be represented in the RAR buffer without increasing its size, improving efficiency and cost.

The age information allows the control circuitry to identify any loads that have been issued in violation of a memory ordering requirement, while the hazard information allows the control circuitry to determine whether those entries are guaranteed to be correct, even if they are in breach of the memory ordering requirement. Thus, power can be saved by not re-issuing loads that are guaranteed to be correct.

Some examples also describe a merge bit. This indicates whether an entry is a merged entry, and can be useful as it can be used to detect when it is safe to flush an entry when one of its associated loads is re-issued.

Thus, overall, the present technique provides many efficiency and cost savings, while allowing processing performance to be improved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
   load issuing circuitry configured to issue load operations to load data from memory, wherein the load issuing circuitry is configured to receive the load operations in a received order and to issue the load operations in an execution order different to the received order;
   memory ordering tracking storage circuitry configured to store memory ordering tracking information on issued load operations, wherein the memory ordering tracking information comprises age information indicative of positions of the issued load operations in the received order; and
   control circuitry configured, in at least one mode of operation, to access the memory ordering tracking storage circuitry to determine, using the memory ordering tracking information:
      whether at least one load operation has been issued in disagreement with a memory ordering requirement; and
      when it is determined that said at least one operation has been issued in disagreement with the memory ordering requirement, to determine whether to re-issue one or more issued load operations or to continue issuing load operations despite disagreement with the memory ordering requirement; and
   wherein the control circuitry is capable of merging the age information for a plurality of issued load operations into a merged entry in the memory ordering tracking storage circuitry so that the age information for the oldest of the plurality of issued load operations is lost.

2. The apparatus of claim 1, wherein:
   the load issuing circuitry comprises an issue queue and an execution unit;
   the issue queue is configured to receive a plurality of load instructions in the received order, wherein the received order is a predetermined program order, and to issue load operations corresponding to the load instructions to the execution unit in the execution order; and
   the execution unit is configured to execute the load operations in the execution order to load the data from memory.

3. The apparatus of claim 1, wherein the age information for said merged entry comprises age information of the youngest of said plurality of issued load operations in the received order.

4. The apparatus of claim 1, wherein the control circuitry is configured to determine whether at least one load operation has been issued in disagreement with the memory ordering requirement based on the age information.

5. The apparatus of claim 4, wherein:
   the age information for said merged entry comprises age information of the youngest of said plurality of issued load operations in the received order; and
   the control circuitry is configured to determine whether at least one of the plurality of load operations has been issued in disagreement with the memory ordering requirement based on the age information of the youngest of said plurality of issued load operations, regardless of the ages of the others of said plurality of issued load operations.

6. The apparatus of claim 1, wherein the control circuitry is configured to merge the memory ordering tracking information for at least a plurality of load operations specifying addresses in the same cache line, to form said merged entry.

7. The apparatus of claim 1, wherein the control circuitry is configured to merge the memory ordering tracking information for a plurality of load operations specifying addresses which give the same result when a predetermined hash function is applied to the addresses, to form said merged entry.

8. The apparatus of claim 1, wherein, in a single-entry mode of operation, the control circuitry is configured to merge memory ordering tracking information for all issued load operations, independently of the addresses specified by the load operations, to form said merged entry.

9. The apparatus of claim 8, wherein, in a multiple-entry mode of operation, the control circuitry is configured to either:
merge the memory ordering tracking information for a subset of the issued load operations to form said merged entry, the subset being selected dependent on the addresses specified by the issued load operations; or
suppress merging of the memory ordering tracking information for the issued load operations.

10. The apparatus of claim 9, wherein, when operating in the multiple-entry mode of operation, the control circuitry is configured to switch from the multiple-entry mode of operation to the single-entry mode of operation when a predetermined condition is satisfied.

11. The apparatus of claim 9, wherein:
when a hazard threshold is exceeded while operating in the single-entry mode of operation, the control circuitry is configured to switch from the single-entry mode of operation to the multiple-entry mode of operation; and
following switching from the single-entry mode of operation to the multiple-entry mode of operation, the control circuitry is configured to suppress switching from the multiple-entry mode of operation to the single-entry mode of operation for a predetermined period.

12. The apparatus of claim 1, wherein, when it is determined that one or more issued load operations need to be re-issued following the determination that the at least one load operation has been issued in disagreement with the memory ordering requirement, the load issuing circuitry is configured to re-issue at least any load operations younger than the youngest issued load operation guaranteed to be correct.

13. The apparatus of claim 1, wherein:
the memory ordering tracking storage circuitry comprises one or more entries, each associated with one or more issued load instructions; and
the memory ordering tracking information for each entry comprises hazard information indicative of whether a hazard has been detected for an address associated with that entry.

14. The apparatus of claim 13, wherein the hazard comprises an event capable of altering data associated with said address associated with that entry.

15. The apparatus of claim 13, wherein, the control circuitry is configured to suppress merging of the memory ordering tracking information for the plurality of issued load operations when the hazard information for an entry associated with one of the plurality of issued load operations indicates that a hazard has been detected for that entry.

16. The apparatus of claim 1, wherein the control circuitry is configured to determine that the at least one load operation has been issued in disagreement with the memory ordering requirement when an issued load operation younger than a memory barrier has been issued before an operation older than the memory barrier instruction.

17. The apparatus of claim 1, wherein:
the control circuitry is configured to determine that the at least one load operation has been issued in disagreement with the memory ordering requirement when an issued load operation, which is younger than a further load operation specifying the same address as the issued load operation, has been issued before the further load.

18. The apparatus of claim 1, wherein the memory ordering tracking information comprises merge information indicative of whether an entry is a merged entry associated with a plurality of load operations.

19. The apparatus of claim 18, wherein:
the load issuing circuitry is configured to receive the load operations in a received order and to issue the load operations in an execution order different to the received order;
the memory ordering tracking information comprises age information indicative of positions of the issued load operations in the received order; and
when it is determined to re-issue the one or more issued load operations which are younger than a given flush point, the control circuitry is configured to flush entries of the memory ordering tracking storage circuitry representing operations younger than the given flush point;
wherein the control circuitry is configured to prevent a given entry of the storage circuitry representing an operation younger than the given flush point being flushed when the merge information indicates that said given entry is a merged entry.

20. The apparatus of claim 19, wherein:
when the given entry is prevented from being flushed, the control circuitry is configured to update the age information for the given entry to indicate the age of the youngest non-re-issued operation preceding the flush point.

21. A method comprising:
receiving, in a received order, load operations to load data from memory;
issuing, in an execution order different to the received order, the load operations;
storing memory ordering tracking information on issued load operations in memory ordering tracking storage circuitry, wherein the memory ordering tracking information comprises age information indicative of positions of the issued load operations in the received order;
in at least one mode of operation, accessing the memory ordering tracking storage circuitry to determine, using the memory ordering tracking information:
whether at least one load operation has been issued in disagreement with a memory ordering requirement; and
when it is determined that said at least one operation has been issued in disagreement with the memory ordering requirement, to determine whether to re-issue one or more issued load operations or to continue issuing load operations despite disagreement with the memory ordering requirement; and
merging the age information for a plurality of issued load operations into a merged entry in the memory ordering tracking storage circuitry so that the age information for the oldest of the plurality of issued load operations is lost.

22. An apparatus comprising:
means for receiving, in a received order, load operations to load data from memory;
means for issuing, in an execution order different to the received order, the load operations;
means for storing memory ordering tracking information on issued load operations wherein the memory ordering tracking information comprises age information indicative of positions of the issued load operations in the received order;
means for accessing the means for storing to determine, in at least one mode of operation, using the memory ordering tracking information:
whether at least one load operation has been issued in disagreement with a memory ordering requirement; and when it is determined that said at least one operation has been issued in disagreement with the memory ordering requirement, to determine whether to re-issue one or more issued load operations or to continue issuing load operations despite disagreement with the memory ordering requirement; and means for merging the age information for a plurality of issued load operations into a merged entry in the means for storing so that the age information for the oldest of the plurality of issued load operations is lost.

\* \* \* \* \*